United States Patent
Gelbart

(10) Patent No.: US 6,819,639 B1
(45) Date of Patent: Nov. 16, 2004

(54) METHOD AND APPARATUS FOR MULTI-CHANNEL AUTO-FOCUS

(75) Inventor: Daniel Gelbart, Vancouver (CA)

(73) Assignee: Creo SRL, Holetown (BB)

( * ) Notice: Subject to any disclaimer, the term of this patent is extended or adjusted under 35 U.S.C. 154(b) by 0 days.

(21) Appl. No.: 09/370,798

(22) Filed: Jul. 15, 1999

(51) Int. Cl.[7] .................................................. G11B 7/00
(52) U.S. Cl. ........................... 369/44.38; 369/112.24; 369/44.31
(58) Field of Search .......................... 369/44.37, 44.38, 369/112.23, 112.24, 112.25, 112.26, 103, 104, 44.23, 97, 44.41, 44.31

(56) References Cited

U.S. PATENT DOCUMENTS

| | | | | |
|---|---|---|---|---|
| 4,376,303 A | * | 3/1983 | Lurie ..................... | 369/124.24 |
| 4,872,743 A | | 10/1989 | Baba et al. | |
| 5,008,705 A | | 4/1991 | Sindledecker ................. | 355/43 |
| 5,537,385 A | * | 7/1996 | Alon et al. .................. | 369/103 |
| 5,561,654 A | * | 10/1996 | Hamilton et al. ............. | 367/97 |
| 5,615,198 A | * | 3/1997 | Kubokwa ................. | 369/44.37 |
| 5,690,785 A | | 11/1997 | Nakaya ................... | 156/626.1 |
| 5,737,300 A | * | 4/1998 | Ota et al. .............. | 369/112.26 |
| 5,764,272 A | | 6/1998 | Sarraf ......................... | 347/246 |
| 5,808,986 A | * | 9/1998 | Jewell et al. ............ | 369/44.37 |

* cited by examiner

Primary Examiner—Thang V. Tran
(74) Attorney, Agent, or Firm—Oyen Wiggs Green & Mutala

(57) ABSTRACT

A method and apparatus are disclosed for a multi-channel imaging system wherein the beams of light corresponding to each channel can be individually auto-focussed. Individual channel focussing permits image data to be recorded on a surface of variable depth, such as the patterned surfaces of semiconductor wafers and masks. A light source illuminates an array of reflective, deformable, micromachined ribbons and the ribbons reflect the light to form beams for the various channels. An auto-focus detector determines the depth profile of a recording surface and focus data for each channel is fed back to the ribbon array. The focus data for a particular channel is used to control the deformation of a corresponding ribbon and consequently, the focal length of the reflected beam. The individual beams can be modulated with image data by an external modulator or by the ribbon array itself. In this manner, the beams for each channel can be focussed at different points in space, so as to effectively record the data onto a patterned recording surface.

43 Claims, 4 Drawing Sheets

METHOD AND APPARATUS FOR MULTI-CHANNEL AUTO-FOCUS

RELATED INVENTIONS

The invention herein disclosed is related to co-owned U.S. Pat. No. 6,268,948 entitled "Micromachined Reflective Light Valve", which issued on Jul. 31, 2001.

FIELD OF THE INVENTION

The invention relates to multi-channel recording of modulated light beams and particularly to writing on media of variable surface profiles, such as the patterned surfaces of semiconductor wafers and masks.

BACKGROUND OF THE INVENTION

Light valve based multi-channel optical recording systems divide a beam of light into a plurality of sub-beams and employ the sub-beams to record data on a recording surface. Each sub-beam corresponds to a particular "channel" on the recording surface. Prior art multi-channel recording systems suffer from several disadvantages which are related to the fact that they use only one optical output system to focus all of the sub-beams. The single optical output system has only one focal length; that is, prior art multi-channel optical recording systems attempt to focus all of the sub-beams to the same depth. This is the case for all prior art multi-beam and/or multi-channel systems, not only ones based on light valves. To provide the best all around focus for the multi-channel system, this focal length is typically selected to be some sort of average over the range of focal lengths required for all of the channels.

Having all of the channels share a single focal length results in a serious deficiency when the number of channels in the recording system is large. In such a situation, the output optics require a relatively large field of view to accommodate the large number of sub-beams. The larger the field of view, the larger the variation required in the optimal focusing point for the various sub-beams. Thus, the maximum number of channels of the optical recording system is limited by the variation in required focal length between the sub-beams.

Additionally, a multi-channel recording system with a single focal length is not suitable to record on surfaces with variable depths or patterned surface profiles, such as the surface of a semiconductor wafer during the lithography process. Clearly, a multi-channel recording system with a single focal length (i.e. a system having all sub-beams focussed at the same depth) can not be used effectively to simultaneously write data to each channel of a surface having regions of variable depth, even if an auto-focus mechanism is used.

Accordingly, it is an object of the present invention to overcome these deficiencies in the prior art by providing a multi-channel optical recording system, wherein the sub-beams of light corresponding to each channel can be individually focussed.

It is a further object of this invention to provide a multi-channel recording that can effectively and efficiently record data into each channel simultaneously on a recording surface having a variable surface profile, such as the patterned surface of a semiconductor wafer during the lithography process.

SUMMARY OF THE INVENTION

The invention herein disclosed relates to an apparatus for a multi-channel optical imaging system. The apparatus includes two sub-systems: a focus sensing subsystem and a focus control and recording subsystem. The focus sensing subsystem is operative to detect a depth profile of a recording surface and use the depth profile to determine a desired focal depth for each of a plurality of recording channels. The focus control and recording subsystem is operative to individually focus light containing optical image data to an actual focal depth, such that in each recording channel, the actual focal point substantially matches the desired focal point. The focus control and recording system is also operative to record the optical image data in each of the plurality of recording channels.

Preferably, the apparatus may further comprise a common imaging lens, which is operative to image the light for each of the plurality of channels during recording.

Advantageously, the focus control and recording subsystem may further comprise a focus control light valve. The focus control light valve comprises an array of individually addressable, deformable, reflective ribbons, suspended over a corresponding array of cavities in a substrate. The ribbons are operative to reflect light in a manner so as to generate a plurality of sub-beams of light, each sub-beam corresponding to one of the plurality of recording channels. Upon application of known electric signals in the vicinity of each of the ribbons, the ribbons are also individually operative to deform a variable amount into the cavities. The deformation of the ribbons changes the focus properties of the sub-beams so as to individually control the actual focal depth for each sub-beam. The amount of deformation of the ribbons is controlled by the electrical signals such that the actual focal depth substantially matches the desired focal depth for each of the channels. Preferably, the known electric signals may contain information about the desired focal depth for each of the plurality of channels on the recording surface, as determined by the focus sensing subsystem.

Advantageously, the focus control light valve may be further operative to modulate each of the sub-beams with optical image data in a manner such that each sub-beam is modulated with optical image data for a distinct one of the plurality of channels.

Alternatively, the apparatus may further comprise a modulation subsystem which is distinct from the focus control light valve and is operative to generate a plurality of sub-beams of light. The distinct modulation subsystem modulates the light prior to the light reaching the focus control light valve. The modulation subsystem which is distinct from the focus control light valve may either be an array of individually addressable laser diodes, where each laser diode creates one sub-beam of modulated light, or, alternatively, a modulation light valve similar to the focus control light valve, but independently operative to modulate each of the sub-beams with the optical image data.

Advantageously, the focus sensing subsystem may further comprise a focus sensing light source and a set of optical elements. The set of optical elements may either be distinct from the common imaging lens, or it may include the common imaging lens. The focus sensing light source and the set of optical elements may be operative, in combination, to image a linearly shaped beam of light onto the recording surface. The focus sensing subsystem may also further comprise a photo-detector located at a non-perpendicular angle from the recording surface, such that when the linearly shaped beam of light is reflected from the recording surface, it creates a two dimensional image on the photo-detector. The shape of the two dimensional image may be proportional to the depth profile of the recording surface.

Preferably, the photo-detector may be either an array of charged coupled devices, or an array of position sensitive detectors.

Advantageously, the apparatus may be implemented with an plurality of channels where the channels are arranged in either a linear fashion or a two dimensional fashion.

Another aspect of the invention concerns a method of multi-channel optical imaging, which comprises the steps of:
  (a) detecting a depth profile of a recording surface;
  (b) using the depth profile of the recording surface to determine a desired focal point for each of a plurality of recording channels;
  (c) individually focusing light bearing optical image data to an actual focal point in each recording channels by using the desired focal points as a reference such that the actual focal point substantially matches the desired focal point in each recording channel; and
  (d) recording the optical image data in each of the plurality of channels on the recording surface.

Advantageously, the recording step may further comprise a step of imaging the light for each of the plurality of channels through a common imaging lens.

The adjusting step may also comprise the additional steps of:
  (a) generating a plurality of sub-beams of light, where each sub-beam corresponds to one of the plurality of channels, by reflecting the light from an array of individually addressable, deformable, reflective ribbons, which are suspended over a corresponding array of cavities in a substrate; and
  (b) applying known electrical signals selectively to each of the ribbons. The electrical signals cause the ribbons to deform a variable amount into the cavities, and the deformation of the ribbons changes the focus properties of the sub-beams so as to individually control the actual focal point for each sub-beam, such that the actual fecal point substantially matches the desired focal point for each of the plurality of channels.

Preferably, the electric signals contain information about the desired focal depth for each of the plurality of channels on the recording surface, as determined by the determining step.

Advantageously, the applying step may further comprise the step of modulating each of the sub-beams with the optical image data. The modulating step may be effected by the array of individually addressable, deformable, reflective ribbons.

Alternatively, the method may comprise the additional steps of producing a plurality of sub-beams of light, and modulating each of the sub-beams with the optical image data. The producing and modulating steps precede the generating step and are effected by means other than the array of individually addressable, deformable, reflective ribbons.

The detecting step may further comprise the step of imaging a linearly shaped beam of light onto the recording surface by using a light source and a set of optical elements. The set of optical elements may either be distinct from the common imaging lens or it may include the common imaging lens. The detecting step may also further comprise the step of creating a two dimensional image on a photo-detector, where the two dimensional image is a non-perpendicular image of the linearly shaped beam of light, distorted by the recording surface. Advantageously, the shape of the two dimensional image on the detector may be proportional to the depth profile of the recording surface.

BRIEF DESCRIPTION OF THE DRAWINGS

FIG. 2-d also depicts now the ribbon array can be used to modulate the individual sub-beams.

DESCRIPTION OF THE PREFERRED EMBODIMENT

Figure 1:
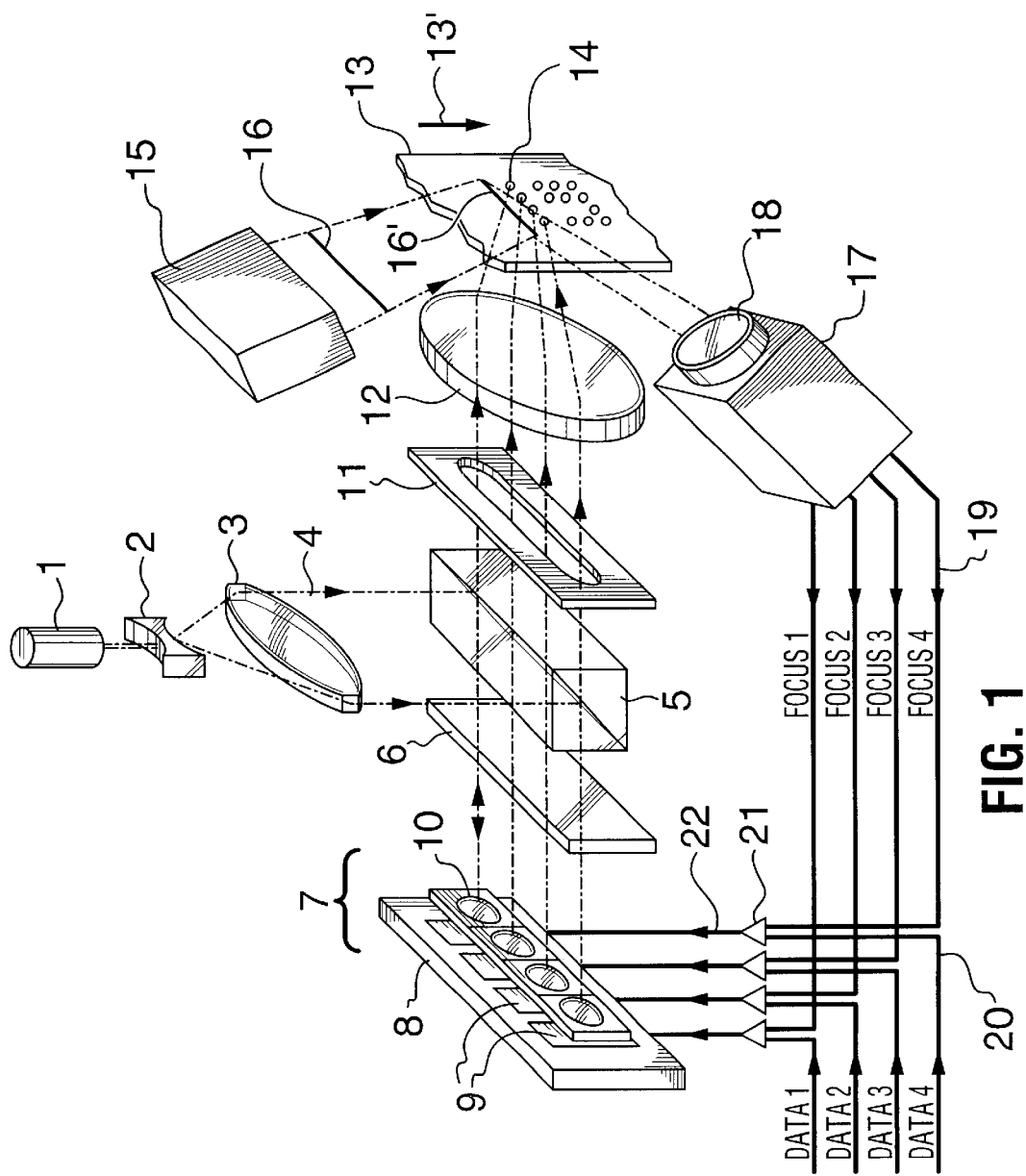
FIG. 1 depicts a particular embodiment of the invention, with the auto-focus detector employing external optics and the modulation of the sub-beams being performed by the ribbon array.
Figure 2A:
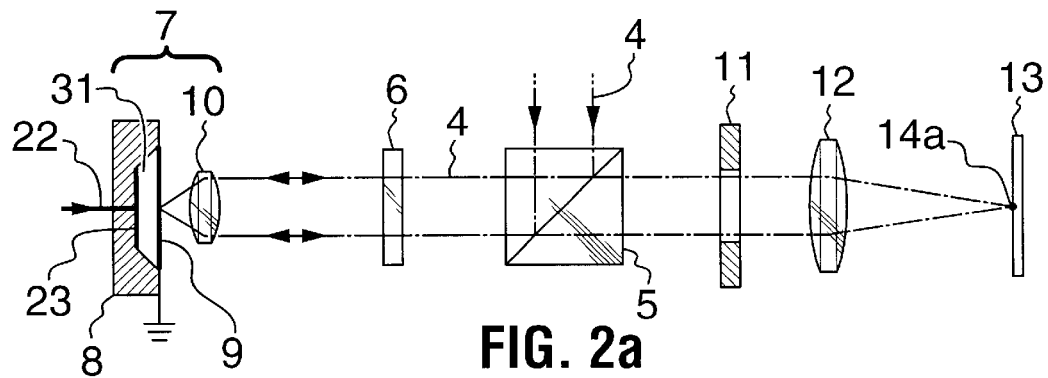
FIGS. 2-a, 2-b and 2-c demonstrate how a deformation in a ribbon can lead to a change in the focal length of the corresponding sub-beam.
Figure 2B:
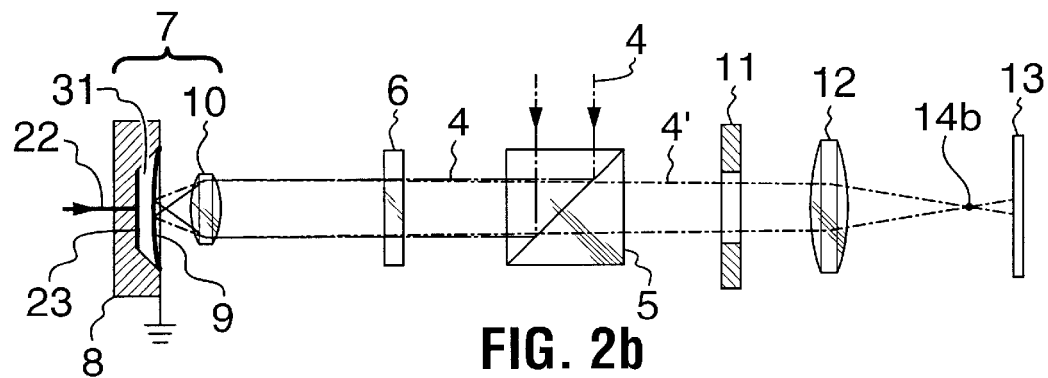
Figure 2C:
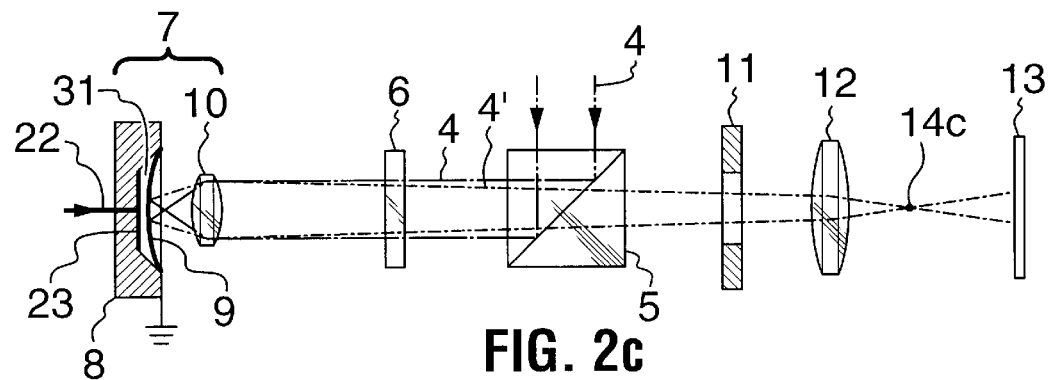
Figure 2D:
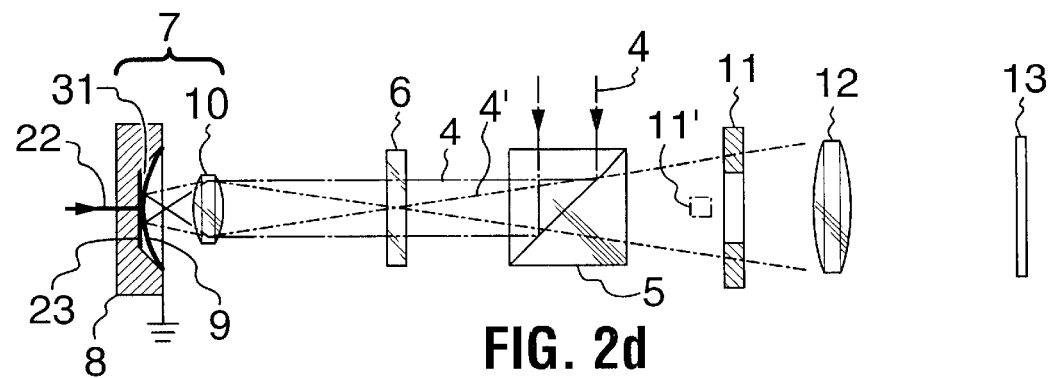

FIG. 1 depicts an embodiment of the apparatus for the present invention. The apparatus is comprised of three distinct functional subsystems: the focus sensing subsystem, the focus control and recording subsystem, and the modulation subsystem. The novelty of the invention lies principally in the focus control and recording subsystem.

(a) The Focus Sensing Subsystem

Figure 3:
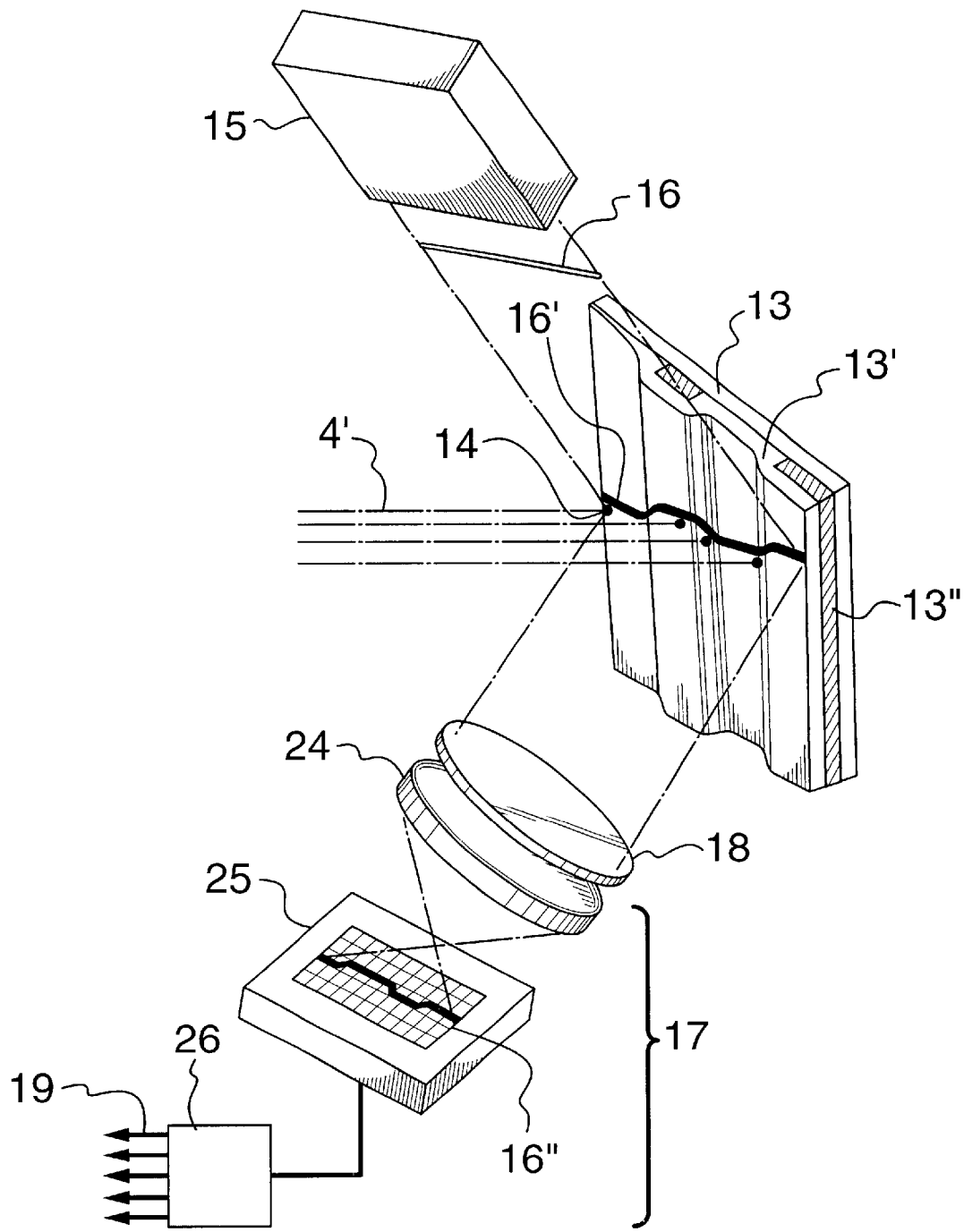
FIG. 3 shows detail of the auto-focus detector and how it can be used to generate data regarding the depth profile of each channel on the recording surface.

The function of the focus sensing subsystem is to determine the desired focal point of each particular channel and to feed that information back to the focus control and recording subsystem. Referring simultaneously to FIG. 1 and FIG. 3, the focus sensing subsystem is explained. The focus sensing laser source and some optical elements (schematically depicted as object 15) are used to generate a thin line 16 of laser light, which is imaged onto the patterned wafer 13, creating image line 16'. When "viewed" from an angle, the line 16' is not straight, rather it appears deformed and bent because of the varying surface profile (i.e. depth) of the wafer 13.

The light reflected at an angle from the image line 16' on wafer 13 travels through filter 18 towards camera 17. Band pass optical filter 18 is used to filter out the more powerful (but different wavelength) imaging light 4, which can blind the focus sensing camera 17. The camera 17, which may be a charge coupled device (CCD) camera or other type of digitizing camera, consists of lens 24 and detector array 25. The light reflected from the various features of the wafer 13 (i.e. line 16') is focused by lens 24 forming a two-dimensional image (line 16") on the detector array 25.

The detector array 25 can be any array of photosensitive detectors including CCD detectors or position sensitive detectors (PSDs). The detector array 25 measures the pixel position and the thickness of the image of line 16'. Because of the varying depth profile of the wafer 13, the image of line 16' that appears on detector array 25 may be deformed, bent, and possibly slightly out of focus (i.e. having increased thickness). The detector array 25 in combination with the electronic element 26 uses this deformation in the two dimensional profile of the image 16" to digitize the image 16" and parse the data, producing a digital signal (focus1, focus2, focus3, focus4 (collectively 19)) corresponding to the desired focal point of each channel on the wafer 13. Finally, these digital signals 19, representing the ideal focal point of each channel, are fed back to the focus control and recording subsystem of the invention, which uses the data 19 to individually control the focal point of each channel. The focus control and recording system is discussed further below.

This type of focus sensing subsystem, commonly referred to as a "structured light" focus detector, is well known in the art and there is no inherent novelty in the focus sensing subsystem, other than its use in the present multi-channel auto-focus imaging system. Such "structured light" systems are used to generate the profiles of three dimensional objects in computer vision systems and are commercially available.

The position of the focus measuring beam 16' relative to the written pattern 14 can be used advantageously to improve the performance of the focussing sub-system as discussed below. If the position of line 16' is placed slightly ahead of the area onto which the pattern 14 is to be written, the focus information 19 will be available a short time prior to the recording of pattern 14. The term "ahead" relates to the scanning direction, as shown by arrow 13' in FIG. 1. This short time compensates for the response time of the focus control subsystem and ensures the sub-beams forming pattern 14 are in focus prior to recording. For a focus control subsystem having a response time of "t", the separation between line 16' and the area at which pattern 14 is recorded should be approximately DX=v•t, where v is the scan velocity (i.e. the speed of relative motion between the recording pattern 14 and the recording material 13).

(b) Focus Control and Recording Subsystem

The novelty of the invention lies in the concept and in the focus control and recording subsystem, whose function is to receive focus data for each channel and to focus the individual channels of the invention so that the image data carried in the sub-beam of each channel is properly recorded at the particular focal point. Referring to FIG. 1 and FIG. 2-*a*, writing laser 1 emits an incident laser beam. The optical elements 2 and 3 create an incident beam that has the desired collimation both horizontally and vertically. Lenses 2 and 3 can be spherical, cylindrical or any combination; typically, lens 2 is a strong cylindrical lens used to collimate the axis with the larger divergence and lens 3 is a weaker cylindrical lens. Additionally, optical elements (not shown) may be required to shape the beam 4.

If the polarization of the writing laser 1 is low, then an additional polarizer (not shown) can be inserted into the incident beam's optical path immediately after lens 3. The linearly polarized and collimated incident beam 4 impinges on polarizing beam splitter 5 and is reflected, after which it passes through quarter wave plate 6 where the polarization of the incident beam is converted from linear to elliptical. It should be noted at this point that although the preferred embodiment of the invention employs the polarizing beam splitter 5, the invention itself does not depend on the polarizing beam splitter 5 and can be implemented with a similar optical device such as a conventional beam splitter. A polarizing beam splitter is the preferred embodiment of the invention, however, because it permits maximum optical efficiency.

The elliptically polarized incident beam then impinges on the active elements of the focus control subsystem 7. These elements include an array of lenslets 10, which causes the beam to converge onto an array of deformable micromachined ribbons 9. Each lenslet 10 corresponds to a particular channel of the multi-channel recording device. The lenslet array 10 can also be implemented using a single lens. In this disclosure, any further discussion of lens (or lenslets) 10 should be understood to encompass either of the single lens or array of lenslet implementations.

The lenslets 10 direct individual sub-beams of incident light at the array of deformable micromachined ribbons 9. Each ribbon 9 in the array is created in a process similar to the creation of monolithic semiconductor devices and is formed such that it spans a cavity 31 (shown in FIG. 2) in the substrate 8. In addition, each ribbon has a metallized reflective coating (not shown), which is operative to reflect the incident sub-beams. The ribbons 9 are deformable and individually addressable, such that when a particular ribbon 9 is in receipt of an electronic signal, it deforms into the cavity 31, effectively translating its reflective surface in space. The deformation of the ribbons 9 is discussed in more detail below.

In combination, the lenslets 10 and the array of deformable ribbons 9 a re operative to control the point of reflection of the converging sub-beams of incident light. This control over the point of reflection of the incident sub-beams amounts to a corresponding control in the properties of the reflected sub-beams. When the overall optical path length from lens 10 to ribbon 9 and back to lens 10 is changed, the degree of collimation of the reflected beam is changed as well.

If the reflective surfaces of the ribbons 9 are located at the focal length of the lenslets 10, then the incident sub-beams are retro-reflected. This retro-reflection situation is depicted in FIG. 2-*a* for an individual sub-beam and its corresponding ribbon 9. Because the incident sub-beam was retro-reflected, the reflected sub-beam is collimated upon travelling back through lens 10 and continues travelling on substantially the same path 4 as the incident light. Upon traveling back through quarter-wave plate 6, the polarization of the reflected sub-beam is converted from elliptical back to linear. However, because of the reflection, the angle of polarization of the reflected sub-beam is orthogonal to that of the incident light. Consequently, when the reflected sub-beam strikes the polarizing beam splitter 5 it is transmitted rather than reflected.

After being transmitted through the polarizing beam splitter 5, the reflected sub-beam impinges on optical element 11. In general, optical element 11 can be any element that has a spatially dependent transmission profile, such that it can convert spatial variations in the light beam into variations in light intensity. For the sake of convenience, optical element 11 is depicted as a slit in the diagrams of this disclosure. However, it should be understood that these diagrams and the ensuing discussion do not limit the invention in any respect. If the reflected sub-beam is substantially collimated by lenslet 10 (as in FIG. 2-*a*), then it will be transmitted by the slit 11. The optical element 11 is important in the modulation subsystem and is discussed further below.

After traveling through slit 11, the reflected sub-beam reaches the principal recording lens 12, which causes the reflected sub-beam to be focused at a particular location in space 14-*a*. In the diagram of FIG. 2-*a*, the recording surface 13 is planar and the focal location 14-*a* corresponds to that of the recording surface 13.

According to the invention, the focal location 14-*a* of a reflected sub-beam can be controlled by regulating the deformation of the corresponding ribbon 9. This is depicted in FIGS. 2-*b* and 2-*c*.

In FIG. 2-*b*, the position of the ribbon 9 is regulated by control signal 22. Control signal 22 is determined by the focus sensing subsystem. That is, focus data 19, for a particular channel (i.e. focus1) is used to determine the control signal 22 for the corresponding ribbon 9. The metallized reflective coating (not shown) of each ribbon 9 is maintained at ground potential and also, the deepest surface 23 of each cavity 31 is coated with metal. Thus, electrical control signal 22 establishes an electrical potential and a corresponding electric field in the vicinity of a particular ribbon 9. The action of the electric field pulls the ribbon 9 into the cavity 31. Although the above description describes a particular implementation, the invention should be understood to include any means of using an electronic signal 22 to effect a deformation in the ribbon 9 and a corresponding translation of the reflective surface.

In FIG. 2-b a slightly shallower focal location 14-b is required. Control signal 22 causes the ribbon 9 to be deformed slightly into the cavity 31. The collimated incident sub-beam traveling on path 4 is caused to converge by the lenslet 10, but because of the deformation of the ribbon 9, it is inverted by the time that it reaches the reflective surface of ribbon 9. As a result, the reflected sub-beam is not retro-reflected and its properties are different from those of the reflected sub-beam in FIG. 2-a. Rather than being collimated after travelling back through lenslet 10, the reflected sub-beam is caused to converge slightly (i.e. such that it travels on path 4').

After being transmitted by the polarizing beam splitter 5 and the slit 11, the slightly convergent reflected sub-beam travelling on path 4' is focused by lens 12. However, since the reflected sub-beam has converged a significant amount, the focal point 14-b of the reflected sub-beam is much shallower than that of the retro-reflected sub-beam of FIG. 2-a.

FIG. 2-c depicts a scenario similar to FIG. 2-b, except that the ribbon 9 is deformed farther into the cavity 31 and the focal point 14-c of the reflected sub)-beam is even nearer than that of FIG. 2-b.

In this manner, data contained in the reflected sub-beam can be focussed and recorded at a different locations (14-a, 14b, 14-c) in space. The focus location (14-a, 14-b, 14-c) for individual sub-beams that write data to individual channels on the recording surface can be independently manipulated by controlling the deformation of the corresponding ribbons 9.

For the sake of simplicity, this disclosure depicts a four channel apparatus (i.e. four ribbons 9 in the ribbon array). It should be noted that the invention is not limited in any way by the number of ribbons 9 in the array. Indeed, to obtain maximum performance, the number of ribbons 9 would be much larger than four, typically being from hundreds to thousands.

With individual channel focus control, as described above, a multi-channel optical recording system can employ a large number of channels while simultaneously maintaining the focus of all sub-beams in their respective channels. In addition, the sub-beams corresponding to various channels can be focussed so as to effectively and efficiently record data into each channel simultaneously on a recording surface having a variable surface profile.

(c) The Modulation Subsystem

The modulation subsystem functions to modulate image data into the individual channels. That is, when the image data is to be written to a particular channel, the modulation subsystem turns that sub-beam on, but when no image data is to be recorded, the modulation subsystem turns that sub-beam off. In the preferred embodiment of the invention, the modulation subsystem is included in the focus control and recording Subsystem. Specifically, the modulation aspect of the present system is performed by the array of deformable ribbons as is disclosed in the related U.S. Pat. No. 6,268,948, entitled "Micromachined Reflective Light Valve", which issued on Jul. 31, 2001.

Referring simultaneously to FIG. 1 and FIG. 2-d, the image data 20 are parsed into individual streams of data (DATA1, DATA2, DATA3, DATA4) corresponding to each channel 14 by electronic devices (not shown). The image data streams (DATA1, DATA2, DATA3, DATA4) for the individual channels 14 are combined with the focus data (FOCUS1, FOCUS2, FOCUS3, FOCUS4) from the autofocus sensing subsystem in the electronic devices 21. The output 22 of the electronic devices 21 controls the deformation of the individual ribbons 9 in the ribbon array. For example, when data is to be recorded in a specific channel 14 (i.e. DATA1 indicates that a record operation is to he performed), then the corresponding focus data (FOCUS1) is allowed to form signal 22, which controls the deformation of that particular ribbon 9. A different situation occurs, however, if DATA1 indicates that a record operation is not to be performed, then a distinct signal 22 is sent to the particular ribbon 9 indicating that no record operation is to be performed. In the simplest form the signals 19 are simply added (using an operational amplifier 21) to signals 20, and DATA=0 will cause recording.

The situation where no recording is to be performed is depicted in FIG. 2-d, where the ribbon control signal 22 has caused a large deformation in the ribbon 9. When the ribbon 9 is translated by such a large distance, the incident sub-beam becomes inverted long before it reaches the reflective surface of ribbon 9. Consequently, the reflected sub-beam that emerges from lenslet 10 converges sharply and then itself becomes inverted, before diverging sharply as it travels along path 4'. After travelling through the polarizing beam splitter 5, the reflected sub-beam diverges strongly, such that only a small fraction of the reflected sub-beam is transmitted by slit 11. The small traction of the optical energy which is transmitted through slit 11 is not strong enough to write on the recording surface 13. In this manner, the invention can be used to modulate the writing operation, such that data is recorded faithfully.

Although this disclosure describes a particular method of modulation, the invention is independent of the modulation scheme employed. The modulation subsystem can be a completely different part of the apparatus. For example, a system can be envisaged where light source 1 is replaced with a source of modulated incident light, such as an external light valve, or an array of individually addressable laser diodes. In such a case, the functionality of the focus sensing subsystem and the focus control and recording subsystem would remain unchanged.

(d) Alternative Embodiment of the Focus Sensing Subsystem

Figure 4:
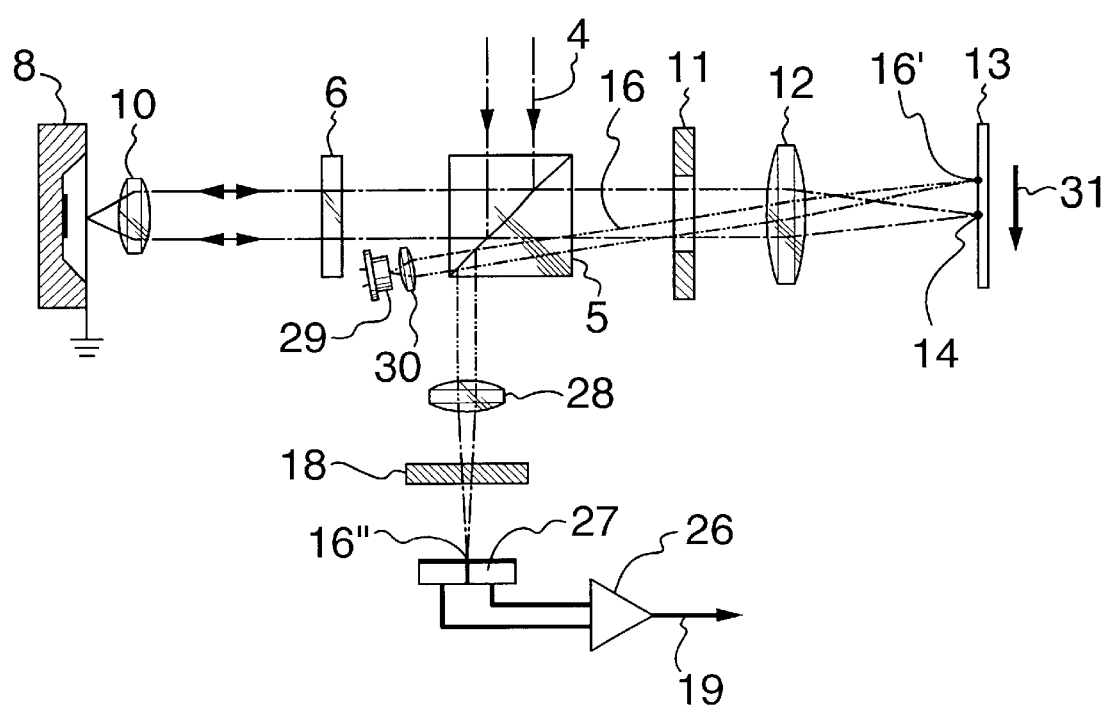
FIG. 4 is a diagram of the invention, where the auto-focus detector employs the same optics as the recording system.

An alternative embodiment of the focus sensing Subsystem is depicted in FIG. 4. In this embodiment, a laser diode 29 provides the focus sensing laser beam. Laser diode 29 shares the same output optics 12 as the focus control and recording subsystem, which is discussed further below. This implementation has the additional advantage that recording is integrally linked to focus sensing. For example, if the focus sensing subsystem uses external optics (as in FIG. 1) and there is an offset error or some other anomaly in the optics 12 of the recording subsystem, then the focus data 19 produced by the focus sensing subsystem will not account for the anomaly in the recording optics 12. The focus sensing mechanism depicted in FIG. 1 is not linked with the recording subsystem, effectively allowing the recording system to run "open loop". On the other hand, if both systems employ the same optics 12 (as in FIG. 4), then the focus sensing subsystem will also be subject to the same offset error or anomaly. Because the focus detecting subsystem is directly linked to the recording subsystem, the focus data 19 produced in the manner depicted in FIG. 4 is more accurate than that produced in the manner depicted in FIG. 1.

In FIG. 4 the focus sensing subsystem and the recording subsystem employ the same optics including beam splitter 5, slit 11, and lens 12. For ease of drawing and explanation, FIG. 4 depicts only one channel. Laser diode 29 provides the focus detecting light, which is of a different wavelength than that of the recording subsystem to avoid being "blinded" by the recording laser. The light from laser diode 29 is collimated and converted to a line by optics 30 (possibly consisting of several lenses), forming a line 16. The line 16 travels at an angle relative to the principal optical axis of the recording subsystem through the beam splitter 5 and the slit 11 until it is focused by lens 12 onto the recording surface 13. Depending on the depth profile of the recording surface 13, the image 16' of the line 16 may or may not be perfectly focused. When reflected at an angle, the image line 16' is not straight, rather it is deformed and bent because of the varying depth profile of the recording surface 13 (this is the same effect that is depicted in FIG. 3). The reflected beam travels back along the same optical path, but is reflected by the beam splitter 5, focussed by lens 28 and filtered by filter 18. Filter 18 is used to block out the recording beam, which may blind the focus detecting subsystem. Detector 27 is used to measure the reflected image of line 16'. In a fashion similar to that of the focus sensing subsystem described above in part (a), the reflected image of line 16' is turned into focus data 19 by electronic device 26, which may be a CCD or PSD detector array. The focus data 19 carries the desired focal locations for the particular sub-beams corresponding to each channel.

It should be understood that the above description is intended for illustrative purposes only, and is not intended to limit the scope of the present invention in any way. Those skilled in the art will appreciate that various in modifications can be made to the embodiments discussed above without departing from the spirit of the present invention.

What is claimed is:

1. An apparatus for a multi-channel optical imaging system, which comprises:
    a focus sensing subsystem operative to detect depth profile of a recording surface and use said depth profile to determine a desired focal point for each of a plurality of channels on said recording surface; and
    a focus control and recording system, which is operative to:
        individually focus light bearing optical image data for each of said plurality of channels by controlling a moveable reflective element associated with each channel in such a manner that an actual focal point for each of said plurality of channels substantially matches said desired focal point for each of said plurality of channels and record said optical image data in each of said plurality of channels on said recording surface.

2. An apparatus according to claim 1, which further comprises a common imaging lens operative to image said light for each of said plurality of channels, causing said optical image data to be recorded in each of said plurality of channels on said recording surface.

3. An apparatus for a multi-channel optical imaging system, which comprises;
    (a) a focus sensing subsystem operative to detect a depth profile of a recording surface and use said depth profile to determine a desired focal point for each of a plurality of channels on said recording surface; and
    (b) a focus control and recording system, which is operative to:
        (i) individually focus light bearing optical image data for each of said plurality of channels to an image, such that the point each channel comes to focus substantially matches said desired focal depth for each of said plurality of channels; and
        (ii) record said optical image data in each of said plurality of channels on said recording surface,
    wherein said focus control and recording subsystem further comprises a focus control light valve, said focus control light valve Comprising an array of individually addressable, deformable, reflective ribbons, suspended over a corresponding array of cavities in a substrate,
    said ribbons operative to reflect light in a manner so as to generate a plurality of sub-beams of light, each subbean corresponding to one of said plurality of channels, and
    upon application of known electric signals in the vicinity of each of said ribbons, said ribbons being individually operative to deform a variable amount into said cavities, said deformation of said ribbons operative to change focus properties of said sub-beams so as to individually control said actual focal point for each sub-beam,
    the amount of said deformation of said ribbons being controlled by said electrical signals such that said actual focal point substantially matches said desired focal point for each of said plurality of channels.

4. An apparatus according to claim 3, wherein said known electric signals contain information about said desired focal point for each of said plurality of channels on said recording surface, as determined by said focus sensing subsystem.

5. An apparatus according to claim 3, wherein said focus control light valve is further operative to modulate each of said sub-beams with said optical image data, such that each sub-beam is modulated with optical image data for a distinct one of said plurality of channels.

6. An apparatus according to claim 3, which further comprises a modulation subsystem which is distinct from said focus control light valve and is operative to generate a plurality of sub-beams of light prior to said light reaching said focus control light valve and to modulate each subbeam with said optical image data, such that each sub-beam is modulated with optical image data for a distinct one of said plurality of channels.

7. An apparatus according to claim 6, wherein said modulation subsystem comprises one of:
    (a) an array of individually addressable laser diodes, each laser diode creating one sub-beam of modulated light; and
    (b) a modulation light valve similar to said focus control light valve, but independently operative to modulate each of said sub-beams with said optical image data.

8. An apparatus for a multi-channel optical imaging system, which comprises:
    (a) a focus sensing subsystem operative to detect a depth profile of a recording surface and use said depth profile to determine a desired focal point for each of a plurality of channels on said recording surface;
    (b) a focus control and recording system, which is operative to:
        (i) individually focus light bearing optical image data for each of said plurality of channels to an image, such that the point each channel comes to focus substantially matches said desired focal depth for each of said plurality of channels; and
        (ii) record said optical image data in each of said plurality of channels on said recording surface; and
    (c) a common imaging lens operative to image said light for each of said plurality of channels, causing said optical image data to be recorded in each of said plurality of channels on said recording surface, wherein said focus sensing subsystem further comprises a focus sensing light source and a set of optical elements, said set of optical elements being distinct from said common imaging lens, and said focus sensing light source and said set of optical elements being operative, in combination, to image a linearly shaped beam of light onto said recording surface.

9. An apparatus for a multi-channel optical imaging system, which comprises:
   (a) a focus sensing subsystem operative to detect a depth profile of a recording surface and use said depth profile to determine a desired focal point for each of a plurality of channels on said recording surface;
   (b) a focus control and recording system, which is operative to:
      (i) individually focus light bearing optical image data for each of said plurality of channels to an image, such that the point each channel comes to focus substantially matches said desired focal depth for each of said plurality of channels; and
      (ii) record said optical image data in each of said plurality of channels on said recording surface; and
   (c) a common imaging lens operative to image said light for each of said plurality of channels, causing said optical image data to be recorded in each of said plurality of channels on said recording surface,
   wherein said focus sensing subsystem further comprises a focus sensing light Source and a set of optical elements, said common imaging lens being one of said set of optical elements, and said focus sensing light source and said set of optical elements being operative, in combination, to image a linearly shaped beam of light onto said recording surface.

10. An apparatus according to claim 8 or claim 9, wherein said focus sensing subsystem further comprises a photo-detector located at a non-perpendicular angle from said recording surface, such that when said linearly shaped beam of light is reflected from said recording surface, it creates a two-dimensional image on said photo-detector wherein a shape of said two dimensional image on said photodetector is proportional to said depth profile of said recording surface.

11. An apparatus according to claim 10, wherein said photo-detector is one of:
   (a) an array of charged coupled devices; and
   (b) an array of position sensitive detectors.

12. An apparatus according to claim 1, wherein said plurality of channels are arranged in one of:
   (a) a linear fashion; and
   (b) a two dimensional fashion.

13. An apparatus for a multi-channel optical imaging system, which comprises:
   (a) a focus sensing subsystem further comprising a focus sensing light source, a set of optical elements, and at least one photo-detector,
   said focus sensing light source and said set of optical elements being operative, in combination, to image a linearly shaped beam of light onto a recording surface and,
   said photo-detector being located at a non-perpendicular angle from said recording surface, such that when said linearly shaped beam of light is reflected from said recording surface, it creates a two dimensional image on said photo-detector, wherein a shape of said two dimensional image on said photo-detector is proportional to a depth profile of said recording surface,
   said depth profile of said recording surface being used to determine a desired focal point for each of a plurality of channels on said recording surface; and
   (b) a focus control and recording subsystem, which further comprises:
      (i) a focus control light valve, said focus control light valve comprising an array of individually addressable, deformable, reflective ribbons, suspended over a corresponding array of cavities in a substrate,
   said ribbons operative to reflect light in a manner so as to generate a plurality of sub-beams of light, each sub-beam bearing optical image data and each sub-beam corresponding to one of said plurality of channels, and
   upon application of known electric signals in the vicinity of each of said ribbons, said ribbons being individually operative to deform a variable amount into said cavities,
   said known electric signals containing information about said desired focal depth for each of said plurality of channels on said recording surface, as determined by said focus sensing subsystem, and
   said deformation of said ribbons operative to change focus properties of said sub-beams so as to individually control said actual focal depth for each sub-beam, the amount of said deformation of said ribbons being controlled by said electrical signals such that said actual focal point substantially matches said desired focal point for each of said plurality of channels; and
      (ii) a common imaging lens operative to image said sub-beams of light onto a recording surface, causing said optical image data to be recorded in each of said plurality of channels on said recording surface.

14. An apparatus according to claim 13, wherein said focus control light valve is further operative to modulate each of said sub-beams with said optical image data, such that each sub-beam is modulated with optical image data for a distinct one of said plurality of channels.

15. A method of multi-channel optical imaging comprising of the steps of:
   detecting a depth profile of a recording surface;
   determining a desired focal point for each of a plurality of channels on said recording surface by using said depth profile;
   individually focussing light bearing optical image data for each of said plurality of channels to an actual focal point by controlling a moveable reflective element associated with each channel in such a manner that said actual focal point substantially matches said desired focal point for each of said plurality of channels; and,
   recording said optical image data in each of said plurality of channels on said recording surface.

16. A method according to claim 15, wherein said recording step further comprises the step of imaging said light for each of said plurality of channels through a common imaging lens, causing said optical image data to be recorded in each of said plurality of channels on said recording surface.

17. A method of multi-channel optical imaging comprising the steps of:
   (a) detecting a depth profile of a recording surface;
   (b) determining a desired focal point for each of a plurality of channels on said recording surface by using said depth profile;

(c) individually focussing light bearing optical image data for each of said plurality of channels to an actual focal depth by using said desired focal depth for each of said plurality of channels as a reference such that said actual focal point substantially matches said desired focal point for each of said plurality of channels; and (d) recording said optical image data in each of said plurality of channels on said recording surface, wherein said step of individually focussing light further comprises the steps of:
  (i) generating a plurality of sub-beams of light, each sub-beam corresponding to one of said plurality of channels, by reflecting said light from an array of individually addressable, deformable, reflective ribbons, which ribbons are suspended over a corresponding array of cavities in a substrate; and
  (ii) applying known electrical signals selectively to each of said ribbons, causing said ribbons to deform a variable amount into said cavities, said deformation of said ribbons changing focus properties of said sub-beams and individually controlling said actual focal depth for each sub-beam, the amount of said deformation of said ribbons being controlled by said electrical signals such that said actual focal point substantially matches said desired focal point for each of said plurality of channels.

18. An method according to claim 11, wherein said known electric signals contain information about said desired focal point for each of said plurality of channels on said recording surface, as determined by said determining step.

19. A method according to claim 17, wherein said applying step further comprises the step of modulating each of said sub-beams with said optical image data, such that each sub-beam is modulated with optical image data for a distinct one of said plurality of channels, said modulating step being effected by said array of individually addressable, deformable, reflective ribbons.

20. A method according to claim 17, which further comprises the steps of:
  (a) producing a plurality of sub-beams of light; and
  (b) modulating each of said sub-beams with said optical image data, such that each sub-beam is modulated with optical image data for a distinct one of said plurality of channels,
  said producing and modulating steps preceding said generating step and being effected by means other than said array of individually addressable, deformable, reflective ribbons.

21. A method of multi-channel optical imaging comprising the steps of:
  (a) detecting a depth profile of a recording surface;
  (b) determining a desired focal point for each of a plurality of channels on said recording surface by using said depth profile;
  (c) individually focussing light bearing optical image data for each of said plurality of channels to an actual focal depth by using said desired focal depth for each of said plurality of channels as a reference such that said actual focal point substantially matches said desired focal point for each of said plurality of channels; and
  (d) recording said optical image data in each of said plurality of channels on said recording surface, wherein said recording step further comprises the step of imaging said light for each of said plurality of channels through a common imaging lens, causing said optical image data to be recorded in each of said plurality of channels on said recording surface, and wherein said detecting step further comprises the step of imaging a linearly shaped beam of light onto said recording surface by using a focus sensing light source and a set of optical elements, said set of optical elements being distinct from said common imaging lens.

22. A method of multi-channel optical imaging comprising the steps of:
  (a) detecting a depth profile of a recording surface;
  (b) determining a desired focal point for each of a plurality of channels on said recording surface by using said depth profile;
  (c) individually focussing light bearing optical image data for each of said plurality of channels to an actual focal depth by using said desired focal depth for each of said plurality of channels as a reference such that said actual focal point substantially matches said desired focal point for each of said plurality of channels; and
  (d) recording said optical image data in each of said plurality of channels on said recording surface, wherein said recording step further comprises the step of imaging said light for each of said plurality of channels through a common imaging lens, causing said optical image data to be recorded in each of said plurality of channels on said recording surface, and wherein said detecting step further comprises the step of imaging a linearly shaped beam of light onto said recording surface by using a focus sensing light source and a set of optical elements, said common imaging lens being one of said set of optical elements.

23. A method according to claim 21 or claim 22, which further comprises the step of creating a two dimensional image on a photo-detector, said two dimensional image being a non-perpendicular reflection of said image of said linearly shaped beam of light from said recording surface, such that a shape of said two dimensional image on said detector is proportional to said depth profile of said recording surface.

24. A method according to claim 15, wherein said plurality of channels are arranged in one of:
  (a) a linear fashion; and
  (b) a two-dimensional fashion.

25. A method of multi-channel optical imaging comprising the steps of:
  (a) detecting a depth profile on a recording surface by:
    (i) imaging a linearly shaped beam of light onto said recording surface by using a focus sensing light source and a set of optical elements; and
    (ii) creating a two dimensional image on a photo-detector, said two dimensional image being a non-perpendicular reflection of said image of said linearly shaped beam of light from said recording surface, such that a shape of said two dimensional image on said detector is proportional to said depth profile of said recording surface;
  (b) determining a desired focal point for each of a plurality of channels on said recording surface by using said depth profile of said recording surface;
  (c) individually focusing light bearing optical image data for each of said plurality of channels to an actual focal point by:
    (i) generating a plurality of sub-beams of light, each sub-beam corresponding to one of said plurality of channels, by reflecting said light from an array of individually addressable, deformable, reflective ribbons, which ribbons are suspended over a corresponding array of cavities in a substrate; and (ii) applying known electrical signals to each of said ribbons, causing said ribbons to deform a variable amount into said cavities, said deformation of said ribbons changing focus properties of said sub-beams and individually controlling said actual focal depth for each sub-beam, the amount of said deformation of said ribbons being controlled by said electrical signals such that said actual focal point substantially matches said desired focal point for each of said plurality of channels; and (d) recording said optical image data contained in each of said plurality of channels on said recording surface by imaging said light for each of said plurality of channels through a common imaging lens.

26. A method according to claim 25, wherein said applying step further comprises the step of modulating each of said sub-beams with said optical image data, such that each sub-beam is modulated with optical image data for a distinct one of said plurality of channels, said modulating step being effected by said array of individually addressable, deformable, reflective ribbons.

27. An apparatus for multi-channel optical imaging system, which comprises:

a focus sensing subsystem operative to detect a depth profile of a recording surface and use said depth profile to determine a desired focal point for each of a plurality of channels on said recording surface; and a focus control and recording system, which is operative to:

individually focus light bearing optical image data for each of said plurality of channels by controlling a moveable optical element associated with each channel in such a manner that an actual focal point for each of said plurality of channels substantially matches said desired focal point for each of said plurality of channels and record said optical image data in each of said plurality of channels on said recording surface, wherein said moveable optical element comprises a ribbon suspended over a cavity in a substrate, said ribbon being deformable in response to an electric signal applied thereto.

28. An apparatus according to claim 1, wherein said moveable optical element comprises a micro-machined element that is moveable in response to an electric signal applied thereto.

29. An apparatus according to claim 28, wherein said electrical signal contains information about said desired focal point for the channel associated with said micro-machined element.

30. An apparatus according to claim 28, wherein said micro-machined element is moveable between a first range of positions, which supports recording of said optical image data on said recording surface, and at least one other position, which prevents recording of said optical image data on said recording surface.

31. A method of multi-channel optical imaging comprising the steps of:

detecting a depth profile of recording surface;

determining a desired focal point for each of a plurality of channels on said recording surface by using said depth profile;

individually focussing light bearing optical image data for each of said plurality of channels to an actual focal point by controlling a moveable optical element associated with each channel in such a manner that said actual focal point substantially matches said desired focal point for each of said plurality of channels; and, recording said optical image data in each of said plurality of channels on said recording surface, wherein said moveable optical element comprises a ribbon suspended over a cavity in a substrate and said individually focusing step comprises:

applying an electrical signal to said ribbon, such that said ribbon deforms into said cavity to control reflection properties of said ribbon;

receiving input light at said ribbon; and reflecting a sub-beam of light from said ribbon in such a manner that the actual focal point of said sub-beam substantially matches said desired focal point for the channel associated with said ribbon.

32. A method of multi-channel optical imaging comprising the steps of:

detecting a depth profile of a recording surface;

determining a desired focal point for each of a plurality of channels on said recording surface by using said depth profile;

individually focussing light bearing optical image data for each of said plurality of channels to an actual focal point by controlling a moveable optical element associated with each channel in such a manner that said actual focal point substantially matches said desired focal point for each of said plurality of channels; and, recording said optical image data in each of said plurality of channels on said recording surface, wherein said moveable optical element comprises a micro-machined element and individually focusing light bearing optical image data comprises:

applying an electrical signal to said micro-machined element, so as to move said micro-machined element to control optical output properties of said micro-machined element;

receiving input light at said micro-machined element; and outputting a sub-beam of light from said micro-machined element in such a manner that the actual focal point of said sub-beam substantially matches said desired focal point for the channel associated with said micro-machined element.

33. A method according to claim 32 comprising determining said electrical signal using information from said step of determining a desired focal point.

34. A method according to claim 32 comprising moving said micro-machined element to modulate said sub-beam with optical image data for the channel associated with said micro-machined element.

35. A method according to claim 32 comprising modulating said input light prior to receiving input light at said micro-machined element.

36. A multi-channel optical imaging apparatus comprising:

a focus sensing system, operative to detect a depth of a recording surface for each of a plurality of imaging channels;

at least one radiation source;

a plurality of moveable reflective elements, each of which receives input light from said radiation source and outputs a sub-beam of light bearing optical image data that is associated with a corresponding one of said imaging channels;

control circuitry connected to move each of the moveable optical elements in response to the depth of its corresponding imaging channel; and, an optical system focussing said sub-beams of light onto the recording surface depths controlled by movement of said moveable reflective elements.

37. A method of multi-channel optical imaging comprising:

obtaining information describing a depth profile over a plurality of imaging channels on a recording surface;

controlling movement of individual reflective elements in an array of moveable reflective elements using said information about said depth profile;

receiving input light at said array of moveable reflective elements; and outputting a plurality of sub-beams of light from said array of moveable reflective elements, each such sub-beam bearing optical image data associated with a corresponding one of said imaging channels and each such sub-beam being focussed onto said recording surface in the corresponding one of said imaging channels, so as to record said optical image data thereon.

38. A method according to claim 37, comprising moving said recording surface and said array of moveable optical elements releative to one another in a scan direction and wherein obtaining information describing the depth profile is performed at a location on said recording surface which is ahead of said scanning direction of locations at which said sub-beams are focussed.

39. A method according to claim 37, comprising moving said micro-machined element to modulate each of said sub-beams with optical image data for the corresponding one of said imaging channels.

40. An imaging apparatus as in claim 1 wherein the focus sensing subsystem is configured to direct a beam of light onto the recording surface and comprises a detector located to detect light reflected from the recording surface, wherein the beam of light is distinct from the light bearing optical image data.

41. A method as in claim 15 wherein detecting a depth profile of the recording surface comprises imaging light separate from the sub-beams onto the recording surface and detecting light reflected from the recording surface.

42. An imaging apparatus as in claim 36 wherein the focus sensing system is configured to direct a beam of light onto the recording surface and comprises a detector located to detect light reflected from the recording surface, wherein the beam of light is distinct from any of the sub-beams of light bearing optical image data.

43. A method according to claim 37 wherein obtaining information describing a depth profile comprises imaging light separate from the sub-beams onto the recording surface and detecting light reflected from the recording surface.

* * * * *